Nov. 15, 1932.   R. B. FEHR   1,888,196
LAP
Filed April 18, 1931   2 Sheets-Sheet 1

INVENTOR
Ray B. Fehr
BY Evans + McCoy
ATTORNEYS

Nov. 15, 1932.  R. B. FEHR  1,888,196
LAP
Filed April 18, 1931  2 Sheets-Sheet 2

INVENTOR
Ray B. Fehr
BY Evans & McCoy
ATTORNEYS

Patented Nov. 15, 1932

1,888,196

UNITED STATES PATENT OFFICE

ROY B. FEHR, OF DETROIT, MICHIGAN, ASSIGNOR, BY MESNE ASSIGNMENTS, TO DETROIT TRUST COMPANY, OF DETROIT, MICHIGAN, A CORPORATION OF MICHIGAN

LAP

Application filed April 18, 1931. Serial No. 531,059.

This invention relates to the art of manufacturing gears, and more particularly to the means used in the method of forming relieved areas in the teeth of the gears disclosed in my copending application Serial No. 523,746, filed Mar. 19, 1931.

In my copending method application I have disclosed gears in which the initial engagement of the mating gear teeth is delayed to the region of the pitch line without altering the engagement of the teeth during their recess action, in order that the noises resulting from impacting engagement may be materially reduced, with the result that a set of gears built in accordance with my invention will be practically silent in operation under light or heavy load. As disclosed in the copending application referred to, this non-impacting result is obtained by forming areas of relief in the active faces of the gear teeth. In one case this action may be accomplished by relieving the addendum faces of the driven sides of all driven teeth from the tips of the teeth to the region of the pitch line, and in another case, this action may be obtained by relieving the dedendum faces of the driving sides of all driving teeth. The object in both cases, however, is to provide a set of gears in which the driving engagement occurs mainly during the angle of recess.

In my copending method application I have described a method of lapping gear teeth which enables the relieved areas to be obtained, and this application relates to the means that may be used in the method of forming the relieved areas on the dedendum faces on the sides of the gear teeth which are to be the driving sides.

It is one of the objects of the present invention to provide a lap for gearing and the like adapted for use in forming an area of relief in the dedendum faces of the driving sides of gear teeth in order to obtain the improved gear tooth action referred to.
Another object is to provide a lap for gears and the like of such construction that it may form an area of relief in the dedendum faces of the driving sides of gear teeth and at the same time may lap the addendum faces of such sides.

Another object is to provide a lap for gears and the like of such construction which in cooperative action with the gear teeth will remove amounts of metal from one surface thereof.

A further object is to provide a lap for gears and the like arranged to have a greater lapping or abrasive action on the dedendum faces of the driving sides of the gear teeth than on the addendum faces of such driven sides.

With the above and other objects in view, which will be apparent from the detailed following description, the present invention consists in certain features of construction and combinations of parts that will be readily understood by those skilled in the art to which the invention appertains.

In the drawings, which illustrate suitable embodiments of the invention,

The laps of my invention are particularly adapted for use in the lapping process disclosed in the Copland et al. patent Reissue No. 18,884, granted November 25, 1930. According to this process an internal gear wheel or lap having its teeth equal in number and complementary in shape to the teeth of the gear to be finished, is coaxially registered with the gear, and relative reciprocating motions are imparted thereto, thus subjecting the teeth to mutual reciprocating action.

During the relative reciprocating motions of the gear and lap, the registration of the gear and lap is preferably progressively changed by intermittently and angularly advancing one in relation to the other while they are out of mutual engagement. This advance may be tooth-by-tooth, or at any desired number of regular intervals.

Assuming that in the gear to be finished the gear teeth are distorted so as to come into contact with the lap in advance of the others, these advanced surfaces will first be worn down, as will also the contacting portions of the lap. However, by reason of the progressive change in registration, the wearing-away of the lap is uniformly distributed over a number or all of the teeth thereof, whereas the lapping of the gear teeth continues on the high spots until these are reduced to the level of the other tooth portions. This same action occurs when the laps are inaccurate. Therefore, not only the gear teeth but also the lap teeth will constantly approach the average form as the lapping proceeds. In other words, the effect of the continuous progressive lapping is to average the contour and circular pitch of all the teeth of both the gear and lap, with the result that the teeth will have a uniform profile and will be equispaced.

In order to form the relief on the dedendum faces of the driving sides of the driving gear teeth entirely by the lapping process, the corresponding faces of the lap teeth are formed in such a manner that when relative reciprocating motions are imparted to the particular gear and lap the dedendum relief will be formed on the sides that are to be the driving sides, and at the same time the addendum faces of the same sides of the teeth may be lapped without substantially altering their selected profile.

Figure 1:
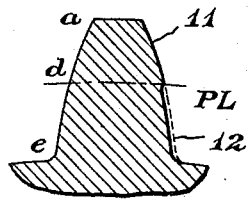
Figure 1 is a diagrammatic view showing the contour of the gear tooth in which the dedendum face of its driving side is relieved abruptly at the pitch line and continuing substantially to the base of the tooth;

Referring to the accompanying drawings, in which like numerals refer to like parts throughout the several views, I have shown in Fig. 1 a gear tooth 11 having a relief 12 formed in the dedendum face $d$—$e$ of the driving side. This particular relief is abruptly formed in the region of the pitch circle PL and continues over the dedendum face substantially to the base of the tooth. I have also shown in Fig. 2 a gear tooth 13 having a relief 14 formed in the dedendum face $d'$—$e'$ which is at a maximum at the base of the tooth and gradually fades out to zero in the region of the pitch line $P'$—$L'$. In actual practice, however, this relief 14 may fade out between the base of the tooth and the pitch line, but for purposes of illustration and description I will in the present case confine the same to the region of the pitch line.

Laps of the present invention are adaptable for use with helical as well as spur gears, the only difference between the two being that in a spur gear lap the lap teeth are arranged parallel with the axis of the lap, and in a helical gear lap the teeth are arranged at the proper helix angle around the interior of the lap. In Figs. 3 to 9 inclusive the laps disclosed are for use in connection with spur gears, although it is to be understood that the same type of lap may be used for helical gears, with the exception that the lap teeth are arranged at the proper helix angle.

Where used in the specification and claims, the terms "longitudinal" and "longitudinally extending", when referring to the lap teeth, are to be construed as referring to both spur and helical teeth.

Figure 3:
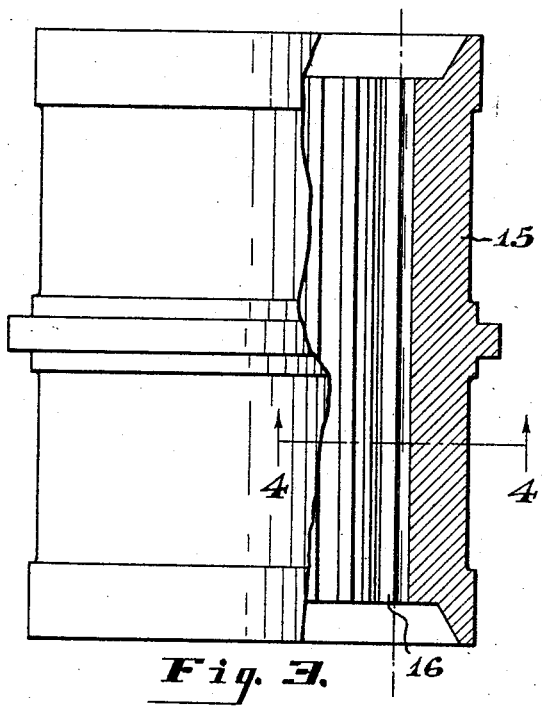
Fig. 3 is a side elevation of one type of lap that may be used in forming the relief shown in Fig. 2, a portion of the lap being broken away to show the same in longitudinal section;
Figure 4:
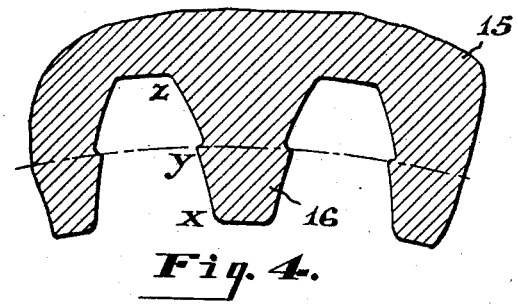
Fig. 4 is an enlarged transverse section taken substantially on the line 4—4 of Fig. 3.
Figure 6:
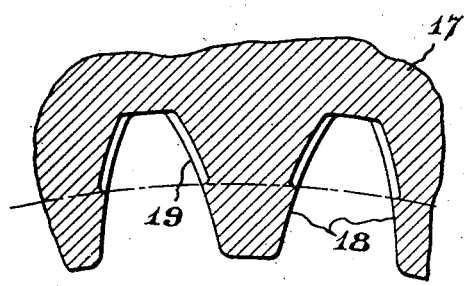
Fig. 6 is an enlarged section taken substantially on line 6—6 of Fig. 5;

In the simplest form of lap for merely forming the addendum relief 12 of Fig. 1, without lapping of the dedendum faces $d$—$e$, I prefer to use the lap 15 illustrated in Figs. 3 and 4. This lap is annular in shape, and its teeth 16 are arranged around the interior thereof in such a manner that they will lie between and be complementary to the faces of the sides of the gear teeth 11. In this particular lap, as in all other types of laps of this annular construction, the pitch line, or rather the pitch circle, is of course of the same diameter as the pitch circle of the gear to be lapped. It is to be noted in particular in the lap 15, that the lap teeth are recessed between the pitch circle and bases thereof to a material depth, thereby providing lap teeth having the faces lying radially of the pitch circle rendered ineffective. In other words, when a given gear and the lap 15 are placed in complementary relation to perform the lapping operation, the faces Y—Z of the lap teeth 16 will not engage with addendum $a$—$d$ of the gear teeth. In order to form the dedendum relief in the driving side of a gear tooth, such as the one illustrated in Fig. 1, the gear and lap are registered with each other, and then a sufficient continuous and resilient pressure is exerted against the lap 15, so that one face X—Y of the lap tooth 16 will bear against the complementary dedendum face $d$—$e$ of the gear to be lapped. Then relative reciprocating motions are imparted to the gear and lap. The lap may be reciprocated relative to the gear, or the gear may be reciprocated relative to the lap, or if desired, reciprocating motions may be imparted to both the gear and lap. During the reciprocation the pressure is continuously and resiliently exerted against the gear teeth by the lap, and as a result of this relative reciprocation, the lap teeth 16, as well as the dedendum faces $d$—$e$ of the gear teeth, will be gradually worn down by the abrasive action, with the result that the substantial relief 12 may be formed, and it will be noted that because of the recessed portions of the lap tooth 16, the relief will be abrupt at the pitch line, as indicated in Fig. 1. If it is desired to form the relief 12 in such a manner that the reliefs will be uniform in contour and be equi-spaced, the gear and lap may be rotated relative to each other when they are out of registration to obtain a different registration of the lap teeth with the gear teeth and this may be, as outlined in the lapping process, tooth-by-tooth, or it may be at any desired number of teeth. In any event, however, a sufficient number of relative reciprocations are imparted to the gear and lap to cause a wearing away of the metal on the dedendum faces $d$—$e$ of the driven sides of the gear teeth 11.

After the reliefs are formed in the dedendum faces of the driving sides of the gear teeth, the addendum faces may be further lapped in accordance with the process previously described, or, if desired, these addendum faces may be lapped before the dedendum relief is formed.

As shown in Fig. 4, both faces Y—Z of the lap teeth 16 are recessed, but it is understood, however, that they may, when desired, be recessed on only one face.

Figure 5:
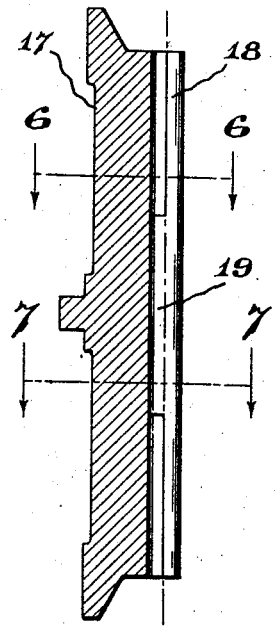
Fig. 5 is a longitudinal section of another type of lap that may be used in forming the relief of Fig. 1 and for lapping the addendum faces of the driving sides of the tooth at the same time.
Figure 7:
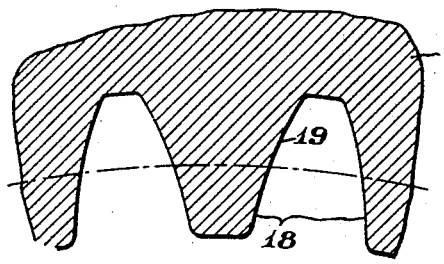
Fig. 7 is an enlarged section taken substantially on the line 7—7 of Fig. 5.

In other cases, however, it may be desirable in forming the dedendum relief of Fig. 1 in the driving sides of the driving teeth while lapping the addendum faces thereof. In this case, I prefer to use the type of lap shown in Figs. 5, 6 and 7. In the lap 17 illustrated in these views, it will be noted that the portions of the lap teeth 18 lying radially inwardly of the pitch circle are of the same general construction as shown in Fig. 3, but that the teeth are not recessed at their central portions intermediate their ends, as indicated in Fig. 5. In other words, the central portion 19 of the lap tooth 18 is formed to full depth, so that such central portion 19 will be complementary to the entire face $a$—$d$—$e$ of the tooth to be lapped, and that the radially inward faces of the lap teeth 18 adjacent the central portion 19 are recessed from the pitch line to the base to provide ineffective face portions. When a lap of this character is used in connection with a gear to be lapped, the lap teeth will lap the addendum faces $a$—$d$ of the gear teeth, and at the same time will lap and form the relief of the type 12 shown in Fig. 1, in the dedendum faces of the sides of the gear teeth which are to be the driving sides thereof. This result is produced by reason of the fact that during relative reciprocations of the gear and lap, the lap teeth throughout a given stroke will have a longer period of contact with the dedendum faces $d$—$e$ of the gear teeth than with the addendum faces $a$—$d$ thereof, with the result that there will be a greater wearing-away of the dedendum faces than of the addendum faces $a$—$d$ of the sides of the teeth which are to be the driving sides thereof. This action is clearly obvious because it will be noted that a narrow radially inward portion 19 of the lap teeth which are of uniform length will have full contact with the faces of the teeth of the gear and that the radially outward portions of the lap which are of greater area than the inward portions will also have contact with only the dedendum faces $d$—$e$ of the sides of the teeth that are to be the driving sides when in operation. When a lap of this character is used the process may be carried out in the manner previously described.

If desired, the outer ends of the radially outward portions of the lap teeth may be partly cut through, instead of being recessed, and furthermore, the radially outward portions may be recessed on one side only.

Figure 2:
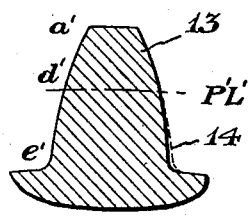
Fig. 2 is a diagrammatic view showing the contour of a gear tooth having its dedendum face on its driving side formed with a relief which gradually fades out to zero near the pitch line;
Figure 9:
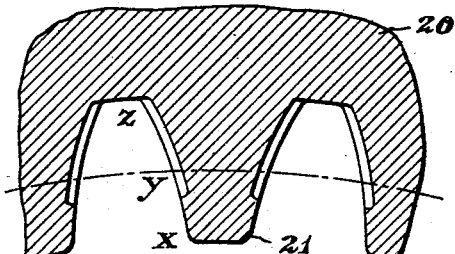
Fig. 9 is an enlarged section taken substantially on the line 9—9 of Fig. 8.
Figure 8:
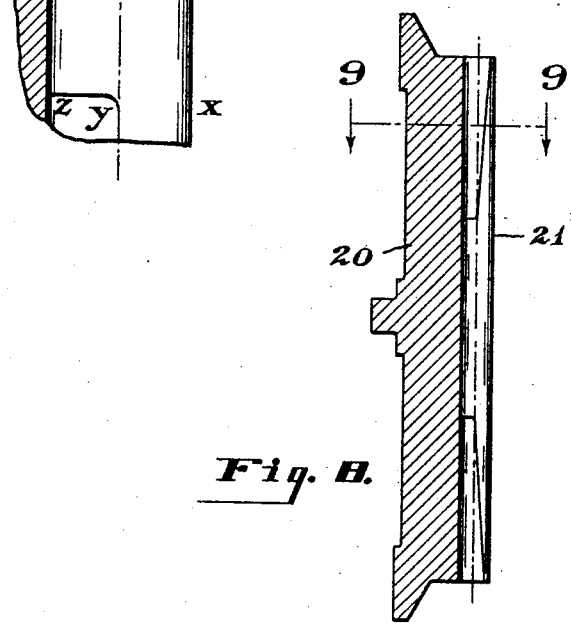
Fig. 8 is a longitudinal section of another type of lap, suitable for use in forming the relief indicated in Fig. 2;

In case it is desired to form the gradual relief 14 in the gear teeth on the dedendum faces $d'$—$e'$ of the driving sides thereof, as indicated in Fig. 2, I prefer to use a lap of the character indicated in Figs. 8 and 9. The lap 20 in this case will lap the addendum faces $d'$—$e'$ of the driving sides of the gear teeth, as well as form the gradual relief 14 in the dedendum faces $d'$—$e'$ thereof. It will be noted that the lap 20 is formed with teeth 21 which are of full depth intermediate the ends thereof substantially as shown in Fig. 8 and also as shown in Fig. 5. In this lap, however, the radially outward end portions of each tooth 21 are not uniformly recessed from their bases to the pitch circle to the extreme ends of the lap tooth, as in the case of the lap 17 of Fig. 5, but are recessed at an angle from the pitch line substantially at the terminations of the central portion of the lap teeth in such a manner that the radially inward face portions of the outer ends of the lap tooth are of very small depth at their extremities and gradually increase in depth as they approach the central full depth portion of the lap. In other words, it will be noted that the area of the faces of each lap tooth that lie radially inwardly of the pitch circle gradually decrease from the pitch circle adjacent the central portion thereof outwardly toward the extremities of the tooth. It will thus be obvious that for a given stroke of the gear and lap relative to each other, that the central portions of the lap teeth which are of uniform longitudinal length will remove uniform amounts of metal, due to the abrasive action, from the addendum faces $a'$—$d'$ of the gear teeth, but furthermore, that in view of the outer ends of the radially inward faces of the lap teeth which gradually decrease in depth as the ends of the teeth are approached, will cause a gradual wearing-away of metal from the bases of the teeth gradually over the dedendum faces $d'$—$e'$ toward the pitch circle of the teeth, so that as a result, the gradual dedendum relief 14 on the sides of the gear teeth which may become the driving sides will be formed and that this relief will be at a maximum at the base of the tooth and will gradually face out substantially at the pitch line. In case, however, that it is desired to have the gradual relief fade out between the base of the tooth and the pitch circle, it is obvious that with this particular type of lap such a condition can be obtained by merely forming the outer faces of the lap teeth so that they merge with the central portion of the lap tooth radially outwardly of the pitch circle.

In some cases, it is to be understood that the lap teeth 21 may be recessed at only one side. Furthermore, it is to be understood that the radially outward end portions may be partly cut through, instead of being recessed, as indicated in Fig. 9.

In using the lap 20 in connection with a gear in which it is desired to form a gradual relief on the dedendum faces of the sides of the gear teeth which are to be driving sides in operation, the gear and lap are given the desired number of reciprocations relative to each other while the lap is subjected to a resilient torque, and when it is desired to have a uniformity of tooth contours and tooth spacing the gear and lap may be rotated relative to each other to change the registration of the teeth in the same manner as previously described.

The laps of the present invention are very advantageous in that gear teeth may be cut with the conventional cutters to their desired profile and then the relief may be formed in the desired dedendum faces of the driving sides thereof in a separate operation in a very efficient manner, with the result that such relief can be more economically obtained with a saving in cost, since the cutters and the like which would necessarily have to be of a modified non-conventional type, would cost considerably more than the cost of conventional cutters and laps of the present invention.

Another advantage which is readily apparent is that the gear teeth can be very efficiently formed with reliefs therein and at the same time they may be very efficiently lapped in accordance with the process described.

It is to be understood that the term "faces", where used in the claims, is to be construed as the faces of the lap teeth that are complementary to the teeth of the gear to be lapped.

It is to be observed from the drawings and foregoing description that in the laps described each lap has the portions that lie radially outwardly of the pitch circle completely recessed and, in some cases, in addition, has these portions partially recessed and rendered partially ineffective in order to obtain the desired results, namely, the formation of a dedendum relief and, in some cases, the formation of a dedendum relief together with a lapping of the addendum faces without altering the selected profile of the addendum faces.

Figure 10:
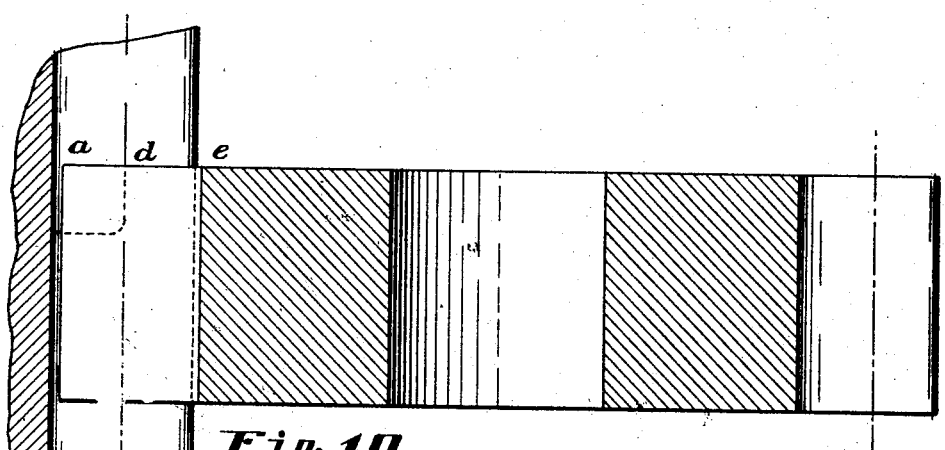
Fig. 10 is a section through a lap and gear showing the cooperative relation therebetween during the lapping of the gear teeth.

In Fig. 10 I have shown one of the relative positions that a gear and lap assume during the lapping process.

Although I have shown and described the present invention as being applicable to the lapping of external gears, it is to be understood that the same may be used in connection with laps for lapping internal gears.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. An annular lap having a series of internal lap teeth arranged around the inner circumferential face thereof substantially complementary to the teeth of a given gear to be lapped, each extending continuously from one end of the lap to the other, and each having the portion thereof extending radially outwardly from the pitch circle partially or completely recessed, whereby the portion lying radially inwardly of the pitch circle may form an area of relief in the dedendum face of the side of the complementary tooth of the given gear which may become the driving side thereof.

2. An annular lap having a series of internal lap teeth arranged around the inner circumferential face thereof substantially complementary to the teeth of a given gear to be lapped, each extending continuously from one end of the lap to the other, at least one of the faces of each tooth having the face portion thereof lying radially outwardly of the pitch circle partially or completely ineffective with respect to the lapping of the addendum face of the side of the complementary tooth of the gear which may become the driving side thereof, whereby the effective face portions of the said lap tooth may form an area of relief in the dedendum face of the said driving side of the complementary gear tooth.

3. An annular lap having a series of longitudinally extending internal lap teeth arranged complementary to the teeth of a given gear to be lapped, at least one of the faces of each lap tooth having the portion thereof lying radially inwardly of the pitch circle of greater area than the remaining face portion thereof, the said remaining face portion from the pitch line radially outwardly to the base thereof being of substantially uniform longitudinal length, whereby, during relative reciprocation of the gear and lap the radially outward face portions of the lap teeth may lap the addendum faces of the sides of the gear teeth which may become the driving sides thereof, and whereby the radially outward face portions of the lap teeth may simultaneously form areas of relief in the dedendum faces of the said driving sides of the gear teeth.

4. An annular lap having a series of longitudinally extending internal lap teeth arranged complementary to the teeth of a given gear to be lapped, at least one of the faces of each lap tooth having the face portion lying radially inwardly of the pitch circle of greater area than the remaining face portion thereof, the said remaining face portion from the pitch line radially outward substantially to the base thereof being of uniform longitudinal length and the said radially inward face portion being of substantially uniform length from the pitch line radially inwardly to the tip thereof, whereby during a relative reciprocation of the gear and lap the radially outward face portions of the lap teeth may lap the addendum faces of the sides of the gear teeth which may become the driving sides thereof and simultaneously the radially inward face portions of the lap teeth may form areas of relief in the dedendum faces of the said driving sides of the gear teeth.

5. An annular lap having a series of longitudinally extending internal lap teeth arranged complementary to the teeth of a given gear to be lapped, at least one of the faces of each lap tooth having the face portion lying radially inwardly of the pitch circle of greater area than the remaining face portion thereof, the said remaining face portion from the pitch line radially outwardly, substantially to the tip thereof, being of substantially uniform longitudinal length and said radially inward face portion being of gradually decreasing area from the radially outward portion toward the end of said lap teeth, whereby during relative reciprocation of the gear and lap the radially outward face portions of the lap teeth may lap the addendum faces of the sides of the gear teeth which are to be the driving sides thereof and simultaneously the radially inward face portions of the lap teeth may form areas of relief in the dedendum faces of the said driving sides of the gear teeth.

6. An annular lap having a series of longitudinally extending internal lap teeth arranged complementary to the teeth of a given gear to be lapped, at least one of the faces of each lap tooth having the face portion lying radially inwardly of the pitch circle of greater area than the radially outward face portion thereof, the said radially outward face portion from the pitch line radially outward to the base thereof being of substantially uniform longitudinal length and the said radially inward face portion being of maximum depth adjacent the radially outward portion and of gradually decreasing depth as said tooth approaches its extremities, whereby, during relative reciprocation of the gear and lap the radially outward face portions of the lap teeth may lap the addendum faces of the sides of the given teeth which are to be the driving sides thereof and simultaneously the radially inward face portions of the lap teeth may form areas of relief in the dedendum faces of the said driving sides of the gear teeth.

7. An annular lap having a series of longitudinally extending internal teeth complementary to the teeth of a given gear to be lapped, each tooth having an intermediate portion extending radially inwardly of the pitch circle, and end portions lying only radially inwardly of the pitch circle, whereby to provide face areas of a magnitude on the faces radially inwardly of the pitch circle greater than on the faces radially outwardly of the pitch circle, said intermediate portion being of uniform longitudinal length outwardly of the pitch circle.

8. An annular lap having a series of longitudinally extending internal lap teeth arranged complementary to at least the dedendum faces of the teeth of a given gear, said lap teeth lapping faces radially inwardly of the pitch circle for forming a relief only in the dedendum face on at least one side of the teeth of the driven gear that is to be the driving side thereof.

9. An annular lap having a series of longitudinally extending internal teeth complementary to the teeth of a given gear to be lapped, each tooth having an intermediate portion extending radially inwardly of the pitch circle, and end portions lying only radially inwardly of the pitch circle, whereby to provide face areas of a magnitude on the faces radially inwardly of the pitch circle greater than on the faces radially outwardly of the pitch circle, said intermediate portion being of uniform longitudinal length outwardly of the pitch circle, and said face portions radially inwardly of the pitch circle being of uniform length and depth.

10. An annular lap having a series of longitudinally extending internal teeth complementary to the teeth of a given gear to be lapped, each tooth having an intermediate portion extending radially inwardly of the pitch circle, and end portions lying only radially inwardly of the pitch circle, whereby to provide face areas of a magnitude on the faces radially inwardly of the pitch circle greater than on the faces radially outwardly of the pitch circle, said intermediate portion being of uniform longitudinal length outwardly of the pitch circle, and said face portions radially inwardly of the pitch circle being of maximum depth adjacent said intermediate portion and being of gradually decreasing depth as they approach their longitudinal extremities.

11. A gear lap having a series of circumferential lap teeth arranged substantially complementary to the teeth of a given gear to be lapped, each extending continuously from one end of the lap to the other, at least one of the faces of each lap tooth having the addendum-lapping face portion partially or completely ineffective with respect to the lapping of the addendum face of the side of the complementary gear tooth that is to be the driving side thereof, whereby the dedendum-lapping face portion may form an area of relief in the addendum face of the said driving side of the complementary gear tooth.

In testimony whereof I affix my signature.

ROY B. FEHR.